Figure 14:
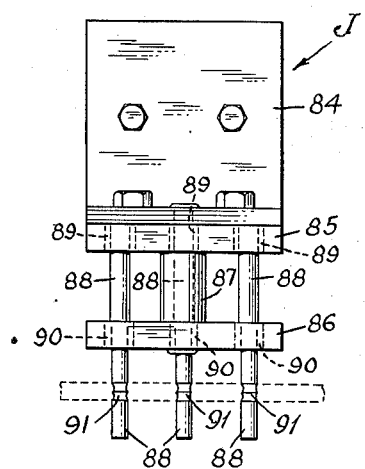

June 22, 1954
R. C. LEGAT
2,681,864
METHOD AND MACHINE FOR FINISHING SLIDE FASTENER STRINGERS
Filed July 7, 1948
5 Sheets-Sheet 1
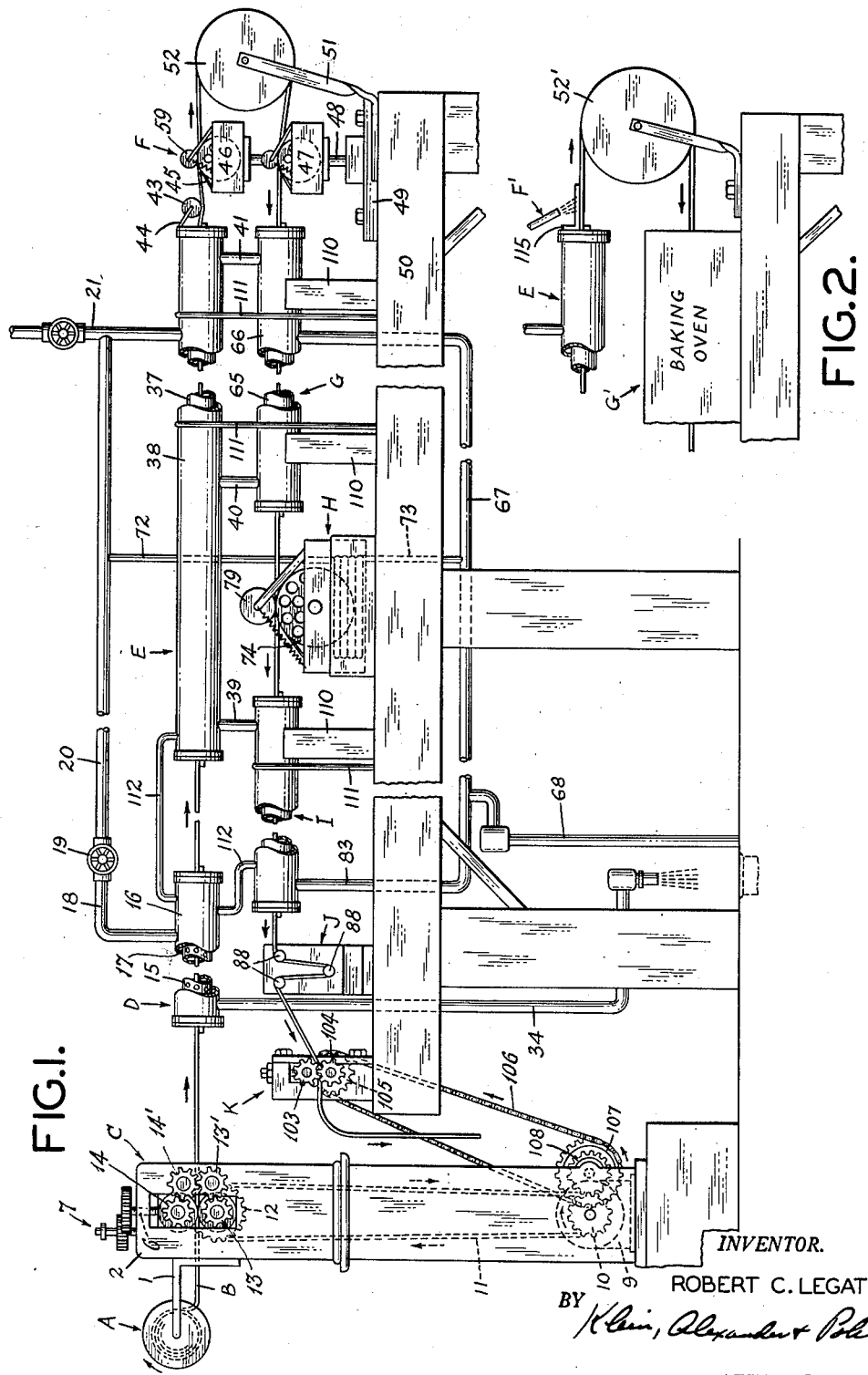
INVENTOR.
ROBERT C. LEGAT
BY
ATTORNEYS.

June 22, 1954  R. C. LEGAT  2,681,864
METHOD AND MACHINE FOR FINISHING SLIDE FASTENER STRINGERS
Filed July 7, 1948  5 Sheets-Sheet 2
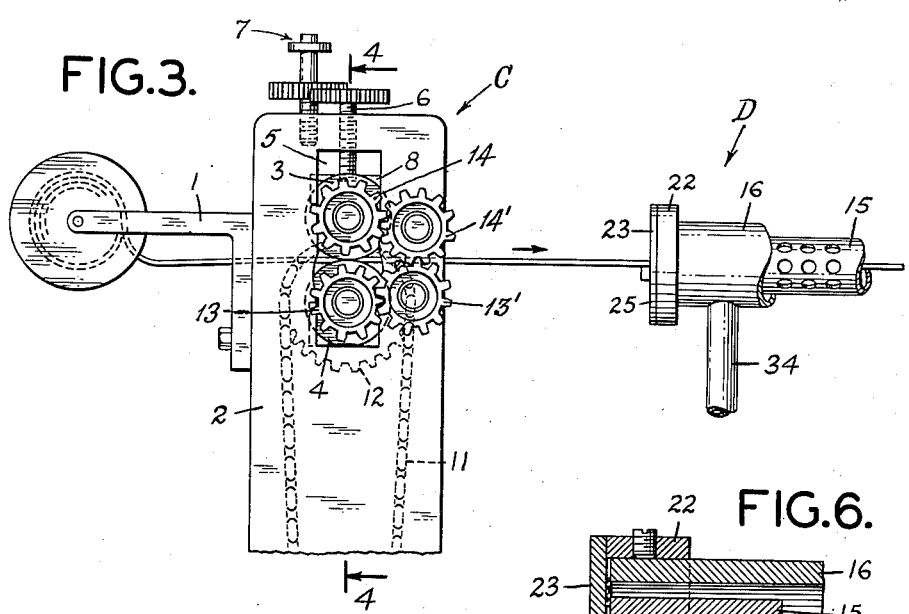
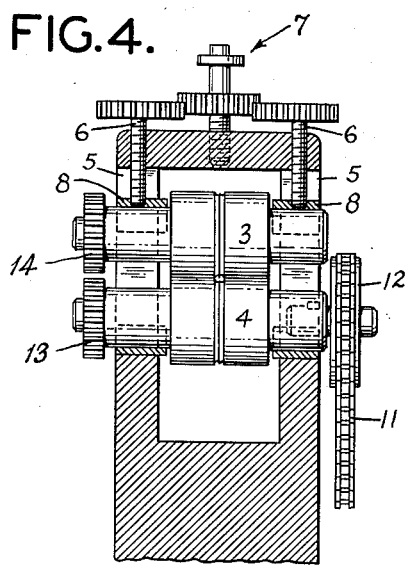
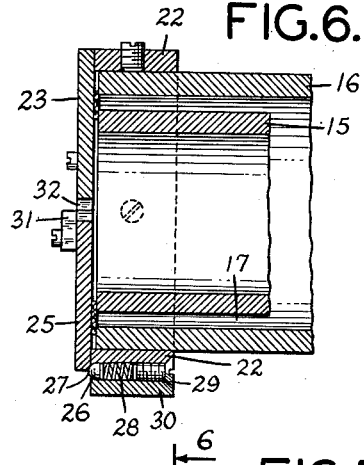
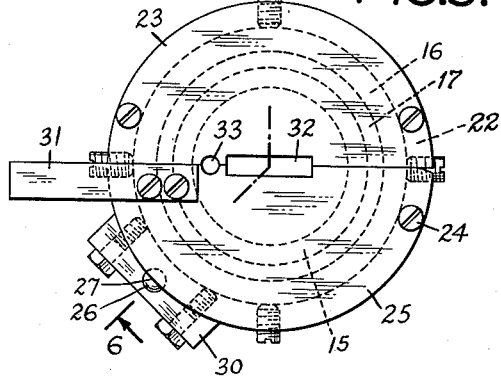
INVENTOR.
ROBERT C. LEGAT
BY
ATTORNEYS.

June 22, 1954 R. C. LEGAT 2,681,864
METHOD AND MACHINE FOR FINISHING SLIDE FASTENER STRINGERS
Filed July 7, 1948 5 Sheets-Sheet 3
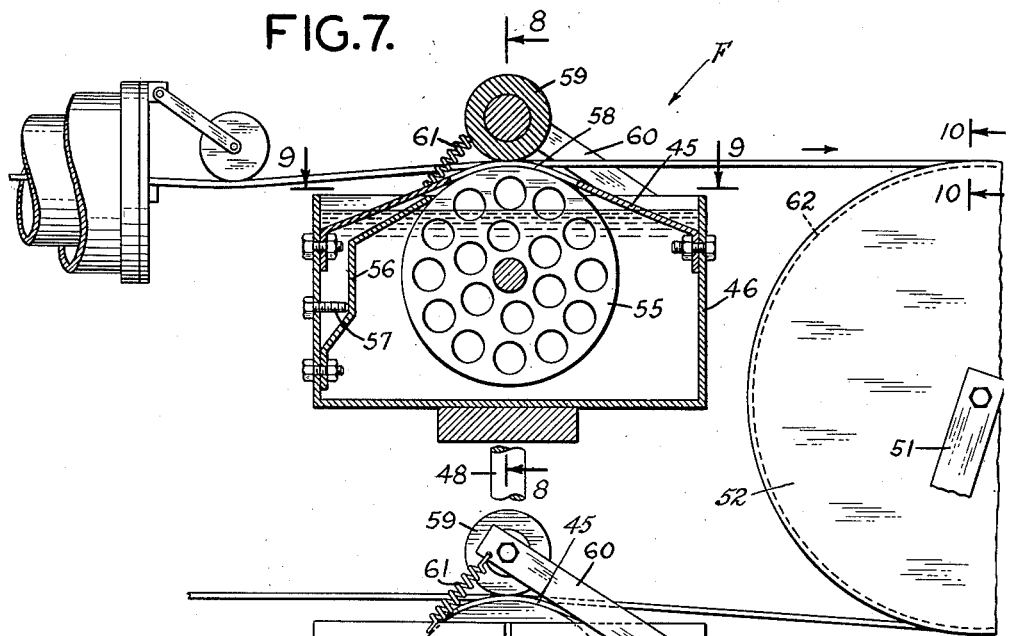
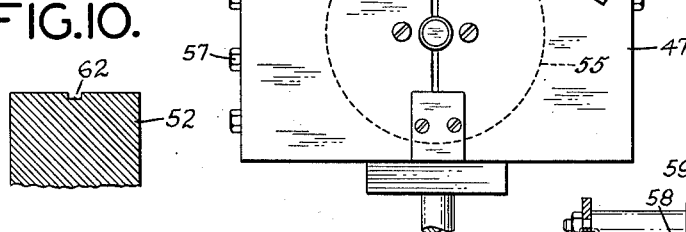
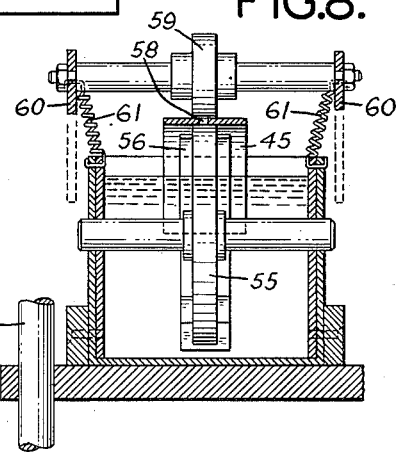
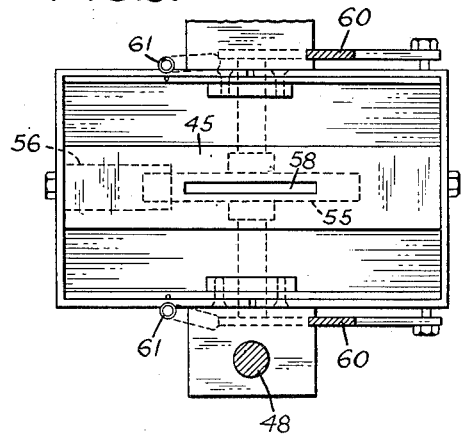
INVENTOR.
ROBERT C. LEGAT
ATTORNEYS.

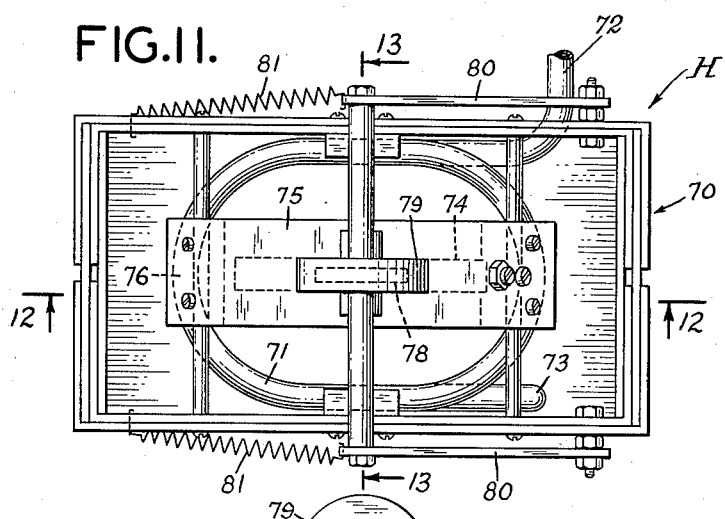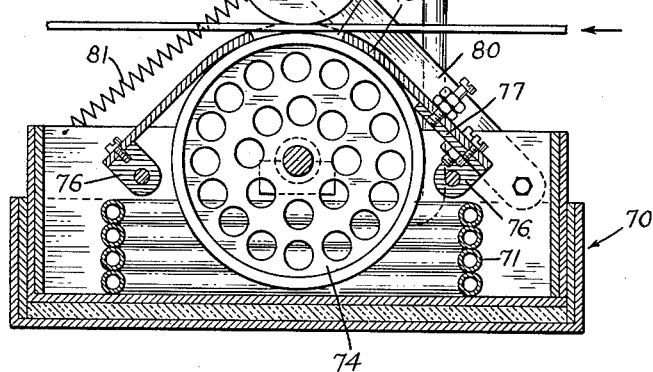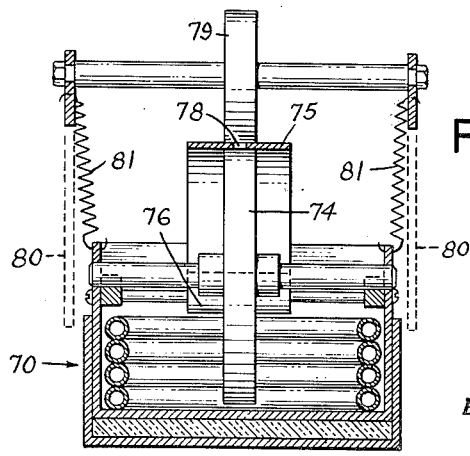

June 22, 1954    R. C. LEGAT    2,681,864
METHOD AND MACHINE FOR FINISHING SLIDE FASTENER STRINGERS
Filed July 7, 1948    5 Sheets-Sheet 5

INVENTOR.
ROBERT C. LEGAT
BY Klein, Alexander & Podell
ATTORNEYS.

Patented June 22, 1954

2,681,864

UNITED STATES PATENT OFFICE 2,681,864

METHOD AND MACHINE FOR FINISHING SLIDE FASTENER STRINGERS

Robert C. Legat, New Britain, Conn., assignor to The G. E. Prentice Mfg. Co., Kensington, Conn., a corporation of Connecticut Application July 7, 1948, Serial No. 37,372

14 Claims. (Cl. 117—7)

This invention relates to the manufacture of slide operated fasteners, and has to do more particularly with the finishing of the stringers for such fasteners.

Fasteners of the indicated type usually include a pair of stringers in the form of tapes having opposed thickened edges upon which are mounted a multiplicity of cooperating locking elements, the interlocking and disengagement of the elements being controlled by a manually operated slider.

In the manufacture of these fasteners, a length of tape having a reinforced or thickened edge is fed to a machine adapted to form and clamp to such reinforced edge of the tape, spaced series of the locking elements. The spacing between each series of elements on the tape is provided for the proper assembly of sliders and stops and for the formation of fasteners of predetermined lengths, each series of elements between spaces, together with the portion of the tape to which such series is attached, constituting a stringer. Prior to the time such tape with the spaced series of attached locking elements is cut up into stringers for the manufacture of finished fasteners, it is usually first subjected to finishing operations, such as shaping and rolling the locking elements to size and washing and ironing the tape. These finishing operations as heretofore practiced, where slow and expensive, involving the use of relatively complicated machinery and many hand operations. Furthermore, because of the many variable factors involved in these prior methods, it was relatively difficult to obtain a uniform product.

The principal object of this invention is to provide an improved method of finishing the stringers whereby the stringers may be completely finished in a continuous fashion and at a relatively high speed with a minimum of cost.

Another object of the invention is to provide an improved method of finishing the stringers to provide a uniform product which can be manipulated with ease and give satisfactory wear.

A further object of the invention is to provide an improved machine for finishing stringers that will be relatively inexpensive to make, have a low cost of maintenance over long periods of time and which will finish the stringers quickly and economically.

A still further object of the invention is to provide a stringer finishing machine which will be continuous in operation and will perform its functions practically automatically and with a minimum of care.

Figure 16:
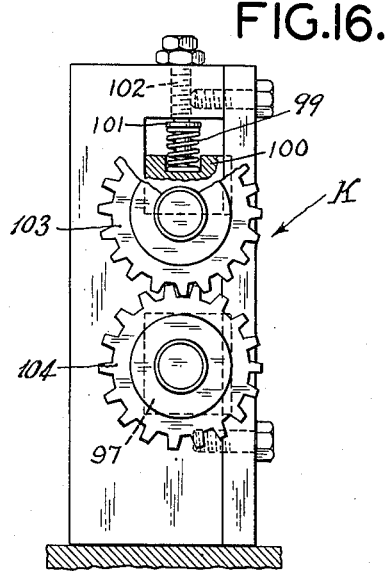
Figure 15:
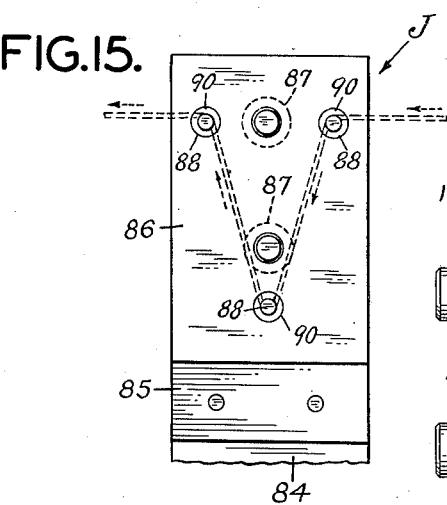
Figure 17:
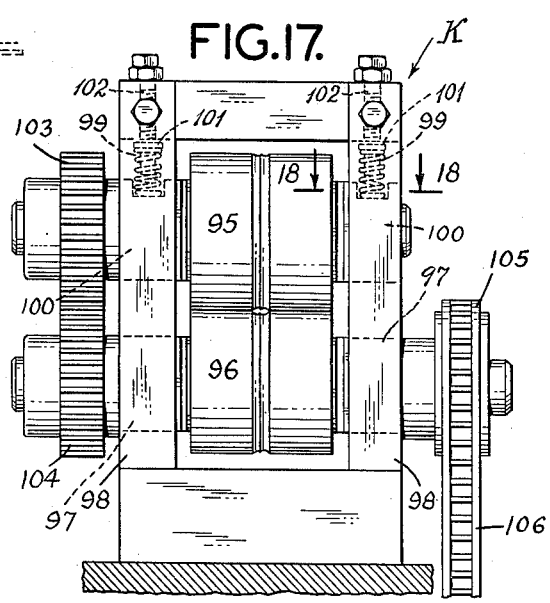
Figure 18:
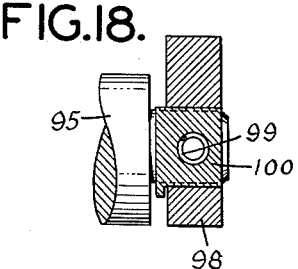

Other objects and advantages of the invention, as well as the novel features of construction, combination and arrangement of the parts, will be apparent after a perusal of the following description, when read in connection with the accompanying drawings, in which Fig. 1 is a broken, side elevational view of the entire machine; Fig. 2 is a detail view showing how the machine may be adapted for enameling instead of lacquering the locking elements; Fig. 3 is a broken, side elevational view of the upper portion of the rolling unit and the adjacent end of the steaming unit; Fig. 4 is a sectional view taken along the line 4—4 of Fig. 3; Fig. 5 is a front elevational view of the end of the steaming unit shown in Fig. 3; Fig. 6 is a section taken along the line 6—6 of Fig. 5; Fig. 7 is a side elevational view partly broken and partly in section, and showing the lacquering unit of the machine, and the adjacent end of the dryer unit; Fig. 8 is a sectional view taken along the line 8—8 of Fig. 7; Fig. 9 is a sectional view taken along the line 9—9 of Fig. 7; Fig. 10 is a section taken along the line 10—10 of Fig. 7; Fig. 11 is a top plan view of the waxing unit; Fig. 12 is a sectional view taken along the line 12—12 of Fig. 11; Fig. 13 is a sectional view taken along the line 13—13 of Fig. 11; Fig. 14 is a top plan view of the breaking down unit; Fig. 15 is a side elevational view of the upper portion of the breaking down unit; Fig. 16 is a side elevational view, partly in section, of the upper portion of the stringer feed unit; Fig. 17 is a rear elevational view of the stringer feed unit and Fig. 18 is a sectional detail view taken along the line 18—18 of Fig. 17.

It is believed that the disclosure of this invention will be facilitated by first referring briefly, to the general construction and operation of the machine disclosed therein. Referring to Fig. 1 of the drawings, a length (or lengths) of tape B, to the reinforced or thickened edge of which has been attached spaced series of locking elements for the making of stringers and which has been wound on a spool A, is fed from such spool to a unit C which shapes and rolls to size, the series of locking elements on the tape. The tape is then passed through a unit D in which it is subjected to live wet steam to soften and shrink the tape and to remove wrinkles therefrom. The tape B then travels through a dryer E to a lacquering unit F which applies a coating of lacquer to the locking units on the tape. The lacquer coating on the locking units is then dried as the tape passes through a drying unit G. Upon emerging from the drying unit G, the locking elements on the tape are provided on one face thereof with a coating of wax by a waxing unit H. The wax applied to the locking elements is dispersed over the elements in a heating unit I as the tape travels to a breaking down unit J which bends the tape to make it as flexible as possible. The tape is drawn through units D through J by a roll feed unit K. The tape as it is discharged from the machine at unit K is completely finished and ready to be cut into stringers for the manufacture of separable fastener structures.

Considering now a more detailed description of the machine, the spool A is rotatably mounted upon a bracket 1 attached to the housing 2 of the rolling unit C which may be of a construction known to the art. As is shown in Figs. 1, 3 and 4, the rolling unit C comprises a pair of pressure rolls 3 and 4 of similar diameters and having centrally located depressions or cavities formed to provide between them an opening conforming in shape to the desired exterior configuration of the locking elements passing therethrough. The pressure rolls 3 and 4 may be rotatably mounted in openings 5, 5 provided in the side frames of the housing of unit C. The lower pressure roll 4 is mounted to rotate about a fixed axis, while the outer reduced ends of upper pressure roll 3 are movably mounted in the openings 5, 5 of the side frames. The spacing between the depressions of the pressure rolls 3 and 4 is controlled by a micrometer setting composed of the screw members 6, 6 threadedly mounted in the upper central portions of the side frames and extending downwardly into the openings 5, 5 and into the bearing members 8, 8 mounted on the reduced end portions of the upper pressure roll 3. The upper ends of the screw members 6, 6 are provided with pinions which are both engaged by the toothed wheel of a micrometer adjusting member 7 rotatably mounted on the top of unit C. The pressure roll 4 is connected in driven relation to a motor 9, through a gear 10 mounted on the shaft of such motor, chain 11 and gear 12 mounted on one end of the shaft of such pressure roll 4. The pressure roll 3 is driven through a gear 13 mounted on the other end of the shaft of pressure roll 4, idler gears 13' and 14' rotatably supported on the housing 2, and gear 14 mounted on the shaft of pressure roll 3. As the integrally connected stringers B are fed through the pressure rolls 3, 4, the tapes thereof will pass between such rolls to one side of the cavities thereof, while the locking elements mounted on the tapes pass between the cavities of such rolls. During their passage between the rolls 3 and 4, the locking elements are rolled to a uniform size and shape; the usual setting of the rollers being such that the elements are reduced in size in a transverse direction between their outer side walls approximately from .079 to .080 inch.

From the pressure rolls 3 and 4, the stringers pass into the spaced steaming unit D which is composed of an inner perforated pipe section 15 arranged longitudinally in alignment with the path of feed of the stringers through such rollers. The perforated pipe 15 which is approximately twelve and one-half inches long and has an internal diameter of about two inches, is enclosed by a pipe section 16 having an interior diameter greater than the exterior diameter of pipe section 15, so that a chamber 17 is formed therebetween (note Figs. 5 and 6). The ends of pipe sections 15 and 16 are welded together so that the ends of chamber 17 are closed. Steam is fed to chamber 17 through pipe 18, valve 19, pipe 20 and supply pipe 21, which is connected to a suitable source of steam. The steam entering chamber 17 passes through the perforations in pipe section 15 and into the interior of the latter. Each end of the steaming unit D is closed by means which are shown more clearly in Figs. 5 and 6 of the drawings and which include a collar 22 secured to the end of pipe section 16. Secured to the collar 22, as by means of screws, is the upper half 23 of a divided cover plate. Pivotally connected at 24 to the collar 22 is the lower half 25 of the cover plate. The lower cover plate 25 is normally maintained in closed position by a latching mechanism composed of a ball bearing 26 adapted to seat a recess 27 formed in the periphery of plate 25, a spring 28 and a set screw 29. The latching mechanism is contained in a chamber formed between the collar 22 and a member 30 secured to the outer surface of the collar 22. The lower cover plate 25 may be opened at will by pressing down on the handle 31 secured to such plate, causing the ball bearing 26 to yield against the pressure of its spring 28 and the plate 25 to pivot about the pivotal point or screw 24. During the pivotal movement of plate 25, the ball bearing 26 will bear against the inner surface of such plate and will be retained in its housing by the latter. When cover plate 25 is to be closed, the handle 31 is raised until the ball bearing 26 again engages with the recess 27 provided on such plate. Thus, entry into the ends of the steam unit is readily attained to thread the stringers therethrough or for any other reason. The stringers B pass into the steam unit through a slot 32 formed at the central portion of the engaged edges of the upper and lower cover plates 23 and 25, and pass out of such unit through a similar slot in the cover plates of the closure means at the discharge end of such unit. An opening 33 may also be provided between the cover plates 23 and 25 of the closure means to prevent the building up of pressure within the steam unit. The condensed steam is drained off through a drain pipe 34 to a place of discharge.

The strip of stringers B upon leaving the steaming unit D, pass through an open space of about a foot in length and then into the drying unit E which is approximately six and one-half feet long. Like the steaming unit D, the drying unit E is composed of two pipe sections 37 and 38 forming a chamber therebetween and welded together at their ends to close the ends of such chamber. Like the steaming unit D, the drying unit is also provided with end closure means similar to the closure means previously described. Steam is fed into the chamber formed between pipe sections 37 and 38 of unit E through the supply pipe and is discharged from such chamber through pipe 39 which is connected to dryer I and through pipes 40 and 41 which are connected to dryer unit G. The inner pipe section 37 of dryer E is unperforated, so that the heat of the steam in the chamber of dryer E is transferred radiantly to the strip B of stringers passing therethrough.

The dried strip B of stringers feeding from the dryer unit E, passes under a roller 43 carried by an arm 44 pivotally mounted on the closure means at the discharge end of dryer unit E. Thus, the weight of roller 43 will serve to depress the strip B prior to its passage over the guide strip 45 of the upper lacquer box 46 in the lacquering unit F. As can be seen more clearly in Figs. 1 and 7 of the drawings, the lacquering unit F is composed of two lacquer boxes 46 and 47 mounted in superimposed relation upon a standard 48 which is supported by a base 49 secured to the bench or frame 50 upon which all of the units except unit C is mounted. Secured to the base 49 is a bracket 51 which inclines upwardly and outwardly from such base and upon the upper end of which is rotatably mounted, an idler roll 52. The roll 52 is so located with respect to the upper box 46 and of such diameter that the lacquer applied to one side of the elements of strip B at box 46, will have time to air dry before the elements reach the lower box 47 for a coating on their opposite surfaces and so that the strip B will be fed at an acute negative angle to the horizontal from roll 52 to the guide strip of box 47.

The construction of boxes 46 and 47 is the same, so it is believed that a detailed description of the upper box 46 will suffice as a description of both boxes. Referring now to Figs. 7 through 9, it will be seen that the guide strip 45 which is made of sheet metal is secured at its ends to opposite sides of box 46 and extends in an arched fashion over the lacquer roll 55. The strip 45 does not bear on lacquer roll 55, but has a clearance of approximately 1/64 to 1/32 of an inch from such roll. Secured at its lower end to a side wall of the box 46 is a brass strip 56 which has a vertically disposed intermediate portion spaced from such supporting side wall and which has an upper end portion inclining upwardly into the space between the guide 45 and the periphery of the lacquer roll 55 on the left of such roll, as viewed in Fig. 7 of the drawings, and functioning as a scraper to control the amount of lacquer to be picked up by the elements on the stringers. Engaging with the vertically disposed intermediate portion of strip 56 is an adjusting screw 57 which is threaded through the said side wall and is provided with a lock nut to retain it in adjusted position. It will be understood that when screw 57 is turned so that it advances into the box 46, it will cause the strip 56 to be moved so as to reduce the clearance between its upper inclined end and the lacquer roll 55, while when screw 57 is withdrawn, it will enable strip 56 to move so as to increase the clearance between its upper end and the lacquer roll 55. Thus, the amount of lacquer that will be applied to the locking elements passing over roll 55 may be controlled by strip 56 and adjusting screw 57.

Not only does the strip 56 control the amount of lacquer that is to be applied to the locking element, but it enables guide 45 to allow such application to be made without the lacquer coming into contact with the tape to which such elements are affixed. This is accomplished by providing the guide 45 in the region of the lacquer roll 55 with a longitudinally extending slot 58 arranged in the path of feed of the locking elements over the guide 45. The slot 58 is slightly wider than the length of the locking elements so that the latter will readily enter into such slot as the stringers are fed over the guide 45 while the tape associated with such element feeds over the solid portion of guide 45. Located above the lacquer roll 55 and bearing on the guide 45 is a roll 59 rotatably mounted on the upper ends of a pair of arms 60 pivotally connected to opposed side walls of the lacquer box 46, as can be seen more readily in Fig. 9 of the drawings. The roll 59 is maintained in yielding engagement with the guide 45 by a pair of springs 61 which are connected at their upper ends to the upper ends of the arms 60 and which are connected at their lower ends to the sides of the box 46 on which such arms are pivoted. Thus, as the locking elements, in the feed of the stringers over the guide 45 come between the rollers 55 and 59, they are depressed by the latter in the slot 58 of such guide into contact with the film of lacquer coating the periphery of roll 55. By depressing the stringers as they emerge from the drying unit E by means of the weighted roll 43, the locking elements are already in the slot 58 by the time they reach roller 59 and the action of the latter is facilitated. Roll 55 which is rotatably mounted on opposed side walls of the box 46 may be perforated in the manner shown in Fig. 7 of the drawings to reduce its weight to a minimum and consequently to enable it to be more readily turned by the feeding line of locking elements.

The locking units which thus have lacquer applied to their lower surfaces, as viewed in Fig. 7 of the drawings, then pass into a central recess 62 (see Fig. 10) provided in the roll 52 which may be made of shellacked maple wood. The recess 62 of roll 52 has a width approximately equal to the length of the locking elements and a depth equal to approximately one-half the thickness of the locking elements, so that the associated tape will ride smoothly on the peripheral wall of roll 52. In their travel from the lacquer roll 55 of box 46 to the roll 52 and from the latter to the lacquer roll 55 of the lower lacquer box 47, the applied lacquer which spreads from the outer surfaces of the elements to which it has been applied over the inner and outer side surfaces of the elements, become dry to the extent that it is no longer tacky. The roll 52 is so constructed and arranged with respect to the lacquer roll 55 of the lower box 47 that the stringers are fed upwardly at an inclined angle to the guide 45 of the lower box so that the locking elements thereof enter into the slot 58 of such guide before reaching the lacquer roll 55. In other words, roll 52 performs with respect to lower box 47, the same function as roll 43 performs with respect to upper box 46. As the locking elements pass between the rolls 55 and 59 of the lower box 47, they are coated wth lacquer on their opposite surfaces in the same manner that has been described with respect to the upper box 46. Due to the fluidity of the lacquer, the locking elements will be completely coated with lacquer as they leave the lower box 47. The coating of lacquer on the locking elements is baked into a hard finish as the elements pass through the next unit G.

Unit G is an elongated drying unit, which has a length of approximately five feet and is composed of an inner unperforated pipe section 65 and an outer pipe section 66 constructed and arranged in a manner similar to unit E to provide a closed steam chamber therebetween and a drying chamber within the inner pipe section 65, the end closures of unit G being similar to those described in detail on the ends of unit D. Steam enters the chamber between pipe sections 65 and 66 through pipes 40 and 41 from unit E and the condensate is discharged to waste through pipes 67 and 68.

After leaving unit G, the stringers pass through the waxing unit H which applies a coating of hot wax to one side of the locking elements. As is shown more clearly in Figs. 11 through 13 of the drawings, the waxing unit H comprises a box 70 made of sheet metal and having an outer covering of asbestos or other heat insulating material. Located in the bottom of box 70 is a coiled steam tube 71 to which steam is furnished from pipe 20 by a pipe section 72 and from which the condensate is drained by a pipe 73 connected to the waste discharge pipe 67. A waxing roller 74 is arranged within the area defined by the coiled tube 71 and is rotatably supported on opposed side walls of the box 70 in any suitable fashion. The web of the roller 74 may be perforated as shown, to make it as light as possible. A guide 75 extends over the roller 74 and is anchored at its ends to brackets 76, 76 mounted on a side wall of the box 70. Secured under one end of guide 75 is a spring blade 77 whose adjustable free end extends toward the periphery of roller 74 and functions as a scraper to control the amount of wax picked up by the roller 74. The central portion of guide 75 which overlies the roller 74, is provided with a longitudinally arranged slot 78 into which the locking elements pass during the feed of the stringers over guide 75; the tape of such stringers passing over guide 75 to one side of the slot 78. Overlying the slot 78 and bearing upon guide 75 is a roller 79 which is rotatably supported on the upper ends of two arms 80, 80 pivotally connected at their lower ends to opposed sides of the box 70. The roller 79 is maintained in engagement with guide 75 by a pair of springs 81, 81 which are connected to the upper ends of arms 80, 80 and to the opposed sides of the box 70. Thus, as the locking elements pass between the rollers 74 and 79, they are depressed by the latter roller into engagement with roller 75 which applies a coating of wax to the exterior surfaces of such elements. Because of the fluidity of the wax, it will be found that after the elements have passed between the rollers, all the exterior surfaces of the elements have wax applied thereto, while the tape to which such elements are attached will be relatively free of wax.

The wax coating is dispersed so thinly over the elements in unit I that the elements have a substantially dry feel. Unit I is similar in construction to the dryer units E and G except that it is substantially shorter in length, being approximately one and one-half feet long. Steam is furnished to the chamber between the pipe sections of unit J from unit E through pipe 39 and the condensate is discharged therefrom through pipe 83 which leads to the waste discharge pipe 68.

The lacquered and waxed stringers are next subjected to a breaking down operation to render the stringers as flexible as possible. This operation is accomplished at unit J which is composed of an upright bearing block 85 secured by means of a bracket 84 to the table 50 and a bearing block 86 secured in spaced relation to block 85 by means of spacer members 87 whose reduced ends are riveted to the blocks 85 and 86 (note Figs. 14 and 15). The block 85 contains three reamed holes within which are located bearing units 89. In a similar manner, block 86 is provided with three bearing units designated 90 and aligned with the bearing units 89 of block 85. The bearing units 89 and 90 rotatably support three break-down pins 88 which project forwardly of block 86. The projecting ends of the pins 88 which are of relatively small diameter, are each provided with an annular recess or channel 91 which conforms in contour to the exterior configuration of the locking elements. It will be seen from Figs. 1 and 15 that the three break-down pins 88 are arranged in triangular relation with two of such pins located in the line of feed of the stringers through the drying unit I and the third pin located intermediate such two pins, but spaced downwardly about three inches below the latter. Thus, as the stringers travel over the two upper revolving pins 88 and under the lower revolving pin 88 with the elements traveling in the channels 91 of such pins, the stringers are subjected to relatively sharp bending actions in two directions. These bending actions or flexing of the stringers will cause any lacquer or wax which may have penetrated the thickened edge of the tape, to be broken up or to be rendered ineffective to modify the tapes flexibility. This operation also increases the flexibleness of the stringers as a whole and makes them more satisfactory for use in fasteners.

From the break-down unit J, the stringers pass through a roll feed unit K composed of two feed rollers 95, 96 provided with centrally arranged annular depressions which together form an opening corresponding to the exterior configuration of the locking elements, as will be seen more clearly in Fig. 17 of the drawings. Roller 96 is rotatably supported by a pair of bearing blocks 97, 97 secured in position on the side frame members 98, 98 of the unit. Roller 95 is movably mounted on the side frame members 98, 98 and is yieldingly pressed into engagement with roll 96 by springs 99, 99 which are seated on bearing members 100, 100 mounted on the reduced ends of roller 95 within the frame members. Seated on the springs 99, 99 are pins 101 whose heads are engaged by the lower ends of the adjustable screws 102, 102 threadedly engaged in the top portions of the frame members. Thus, by adjusting the screws 102, 102, the pressure of the springs 99, 99 on the bearing members 100, 100 and consequently on the roller 95 may be varied. Rollers 95 and 96 are drivenly connected together by gear 103 mounted on the reduced end of roller 95 and by gear 104 mounted on the reduced end of roller 96, gears 103 and 104 being similar and rollers 95 and 96 being of the same diameter so that the peripheral speed of such rollers will be the same. Connected to the other reduced end of roller 96 is a gear 105 which is connected by a chain 106 to a driven gear 107 (see Fig. 1). Gear 107 is driven by gear 10 on the shaft of motor 9 through an idler gear 108. It is preferred that the driving arrangement of rollers 95 and 96 be such that their peripheral speed is slightly greater than the speed of rotation of roller 4 in unit C so that the strip of stringers is under tension as it is fed through the intermediate finishing units. After the strip of stringers has passed through the feed unit K, it is assembled in any suitable manner for the manufacture of fasteners.

It is believed to be evident from the foregoing description, that the machine of this invention is composed of parts which are relatively simple and rugged in construction, and which are relatively inexpensive to make and assemble. All the units D through K can be readily and securely assembled in line on a table in the manner shown in Fig. 1 of the drawings by means of supports 110, U-shaped members 111 and brace members 112. The arrangement of pipes extending through the table 50 add to the rigidity of the machine.

The machine in its operations, finishes the stringers quite rapidly, the stringers being fed in a continuous manner without interruption for any finishing operation. In practice, stringers have been finished with this machine at the rate of fifty feet per minute. Coupled with the facts that the stringers are completely finished in one cycle of operations of the machine and that no handling of the stringers is required in the machine's operations, it will be readily understood that this machine substantially reduces the cost of finishing stringers.

It is believed that a proper understanding of the operation of the machine will be obtained from the above description, but for the sake of clearness, a brief résumé of the operations of the machine is given. The strip B of stringers as it leaves the spool of work A is first passed through the rollers of unit C which shape and roll the locking members attached to the tapes thereof, to a uniform size. The positively driven roller 4 and pressed roller 3 of unit C also serve to unwind the strip B from the roll A and feed it to the machine. These rollers are in synchronism with rollers 95 and 96 of the feed unit K and preferably are slightly slower in peripheral speed than the latter, so that intermediate units C and K, the strip B in its passage through the machine is under a slight tension. The advantages of this applied tension are that wrinkles are prevented from forming in the tape and the shrinkage of the tape is controlled and made uniform despite the differences in the cross sectional area and uniformity of construction of the tape. Furthermore, the locking elements of the stringers are maintained in relatively uniform spaced relation through the shrinking and drying operations performed on the stringers. The shrinking of the tape, as well as the softening of the tape and removal of wrinkles therefrom, is principally accomplished by the live wet steam through which the stringers pass in their travel through the steaming unit D. Practice has shown, that best results are accomplished by subjecting the stringers to live wet steam having a pressure of from twenty-five to thirty-two pounds. As the stringers are discharged from unit D, they are wetted by the steam and in order that they may be dried and the shrinking of the tape completed, they are then passed through the dryer unit E. In unit E, the stringers are subjected to a hot, dry heat which together with the tension exerted thereon, completes the shrinking of the tape uniformly and at the same time, in effect, irons out all wrinkles in the tape. The stringers are discharged from unit E in a perfectly dry condition with the tapes thereof smooth and clean.

At station or unit F, the apparatus thereof, applies lacquer to both sides of the locking elements discharged by unit E, the applied lacquer flowing over the transverse surfaces of the elements to completely cover the exteriors of such elements. While the lacquer is applied cold, the locking elements are quite hot from their treatment at unit E, so that the lacquer flows readily and smoothly over such elements and dries relatively quickly. As the construction of this apparatus is such that the lacquer is applied solely to the elements, and does not get on the tape to which the elements are attached, the flexibleness of the stringers is unaffected by this lacquer applying operation. It will be noted that the idler wheel 52 which is so arranged as to permit the first coating of lacquer to dry before the second coating is applied, also maintains the tape smooth and under the tension exerted on such tape, further irons the latter. The baking of the applied lacquer is accomplished by unit G prior to the application of wax to the locking elements at station H. While the wax is applied to only one side of the elements, due to the fact that the wax has been heated to its boiling point, it will creep up the transverse surfaces of the elements and cover the opposite sides thereof. The coating of wax on the elements, acts as a lubricant to facilitate the operation of the slider until the fastener has been broken in, during actual usage. After the wax has been thinly dispersed by the application of heat at unit I, the stringers are bent in two directions by the break-down pins at unit J to give to the stringers, their maximum flexibility. The stringers are drawn through the several units of the machine by the rollers 95, 96 of the feed unit K. This drawing action is exerted uniformly on the tape of the stringers, the rollers 95, 96 exerting no pulling action on the locking elements which pass freely therebetween in the channels formed in such rollers. The applied uniform tension on the tape, as well as the ironing of the steamer unit D, the dryer unit E, the sheave or wheel 52 and the break-down pins of unit J, result in a smooth tape that is entirely free of wrinkles as it is discharged by unit K.

In the operation of the machine, the lacquer unit may function idly to apply no lacquer to the locking elements if the latter are made of a material such as aluminum, as such material need not be protected by a lacquer coating. When the locking elements are made of brass or bronze however, it is desirable that the lacquer coating be applied to them to prevent tarnishing. When it is desired that the locking element be enamelled, the lacquer unit F may be replaced by an enamel spray nozzle F' (see Fig. 2), and the heating unit G replaced by a baking oven G', capable of baking the applied enamel as the strip B of stringers pass therethrough on its way to the waxing unit H. As an enamel coating is primarily applied for appearance purposes, it is only necessary to apply the same to one side of the stringers; which side will be the outer side of the completed fastener. In the application of enamel to the elements, it is preferable that the idler wheel 52' be spaced a greater distance from nozzle F' and baking oven G', than is wheel 52 of unit F in order that the enamel may be completely air dried before entering the baking oven G'. If desired, a slotted shield 115 may be mounted on the discharge end of unit E to obviate any danger of the sprayed enamel falling on the tape as the elements pass beneath the spray nozzle F'.

It will be evident to those skilled in the art, that other variations and modifications in the machine may be made without departing from the spirit of the invention or the scope of the appended claims.

I claim:

1. A continuous method of finishing slide fastener stringers composed of fabric tape and a series of locking elements which are attached to an edge of such tape and are adapted to interlock with the series of locking elements of another stringer, comprising taking two strips of connected stringers with the locking elements on the stringers, of one strip interlocked with the locking elements on the stringers of the other strip and feeding such interlocked strips under tension at a predetermined rate without interruption and during such continuous feed of the strips subjecting the tapes of such stringers in a substantially closed chamber to a wet, hot steam capable of shrinking the tapes of such stringers and taking out wrinkles in such tapes, then drying the stringers at an elevated temperature such as will complete the shrinking of the stringer tapes and render such tapes and the locking elements thereon completely dry, applying a coating of molten wax to one face of the locking elements while the latter are in a heated condition and while protecting the tapes from such wax, subjecting the wax-coated locking elements of such stringers to an elevated temperature to disperse the wax over the elements, and flexing the interlocked stringers by bending them in two directions at relatively sharp angles to break up any wax between the elements thereof, while maintaining the tapes thereof in unwrinkled condition.

2. A continuous method of finishing slide fastener stringers composed of fabric tape and a series of locking elements which are attached to an edge of such tape and are adapted to interlock with the series of locking elements of another stringer, comprising feeding strips of connected stringers with the locking elements on the stringers of one strip interlocked with the locking elements on the stringers of the other strip from a source of supply at a predetermined rate without interruption and during such feeding action, drawing on the tapes of such interlocked strips at a point spaced from the feeding station without interruption and at a predetermined rate greater than that of said feeding station, so that the stringers intermediate the feeding and drawing stations are under a predetermined tension, and during such continuous feed of the strips under tension intermediate such feeding and drawing stations, subjecting the tapes of such stringers in a substantially closed chamber to a wet, hot steam capable of shrinking the tapes of such stringers and taking out wrinkles in such tapes, then drying the stringers at an elevated temperature such as will complete the shrinking of the stringer tapes and render such tapes and the locking elements thereon completely dry, applying a liquid coating material hardenable to form a solid protective coating to the locking elements while the latter are in a heated condition and while protecting the tapes from such material, air drying the applied coating material for a predetermined period to harden the same, and flexing the interlocked stringers by bending them in two directions at relatively sharp angles to break up any coating material between the elements thereof, while maintaining the tapes thereof in unwrinkled condition.

3. A continuous method of finishing slide fastener stringers composed of fabric tape and a series of locking elements which are attached to an edge of such tape and are adapted to interlock with the series of locking elements of another stringer, comprising taking two strips of connected stringers with the locking elements on the stringers of one strip interlocked with the locking elements on the stringers of the other strip, and feeding such interlocked strips at a predetermined rate without interruption and under a predetermined tension, and during such continuous feed of the interlocked strips, subjecting the tapes of such stringers in a substantially closed chamber to a wet, hot steam capable of shrinking the tapes of such stringers and taking out wrinkles in such tapes, then drying the stringers at an elevated temperature, such as will complete the shrinking of the stringer tapes and render such tapes and the locking elements thereon, completely dry, then applying to the heated locking elements a coating of liquid covering material hardenable to form a solid protective coating, air drying the applied covering material for a predetermined period and then subjecting such covering material to a high heat to harden the same, applying a coating of molten wax to the locking elements while the latter are in a heated condition and while protecting the tapes from such wax, and flexing the interlocked stringers by bending them in two directions at relatively sharp angles to break up any coating material between the elements thereof, while maintaining the tapes thereof in unwrinkled condition.

4. A machine for finishing in a continuous fashion slide fastener stringers composed of fabric tape and a series of locking elements which are attached to an edge of such tape and are adapted to interlock with the series of locking elements of another stringer, comprising means for continuously feeding at a predetermined rate interlocked locking elements on two strips of connected stringers, means including a chamber having an entry end and a discharge end for the strip of connected stringers, means for supplying wet, hot steam at a predetermined pressure to said chamber to shrink and remove the wrinkles from the tapes passing therethrough, means for heat drying the steam wetted strips, means for applying a coating of molten wax to the locking elements on said strips heated by said steam chamber and drying means, means for flexing the stringers in two directions at relatively sharp angles to break up any wax between the elements thereof while maintaining the tapes thereof in unwrinkled condition, and means for drawing the tapes of the interlocked strips through said chamber, drying and waxing means without interruption at a substantially constant rate of speed greater than that of said feeding means so as to place the tapes of said stringers under tension during their continuous feed through said chamber, drying and waxing means.

5. A machine for finishing in a continuous fashion slide fastener stringers composed of fabric tape and a series of locking elements which are attached to an edge of such tape and are adapted to interlock with the series of locking elements of another stringer, comprising means for continuously feeding at a predetermined rate interlocked locking elements on two strips of connected stringers, means including a chamber having an entry end and a discharge end for the strips of connected stringers, means for supplying wet, hot steam at a predetermined pressure to said chamber to shrink and remove the wrinkles from the tapes passing therethrough, a drying chamber aligned with said steam chamber for heat drying the steam wetted strips, means for applying a coating of molten wax to one face of the locking elements on said strips heated by said steam chamber and drying means, means for applying an elevated temperature to the wax-coated elements to disperse the wax over the same, means for flexing the stringers in two directions at relatively sharp angles to break up any wax between the elements thereof while maintaining the tapes thereof in unwrinkled condition, and means for drawing the tapes of the interlocked strips through said chamber, drying and waxing means at a predetermined constant rate of speed greater than that of said feeding means so as to place the tapes of such stringers under a predetermined tension during their continuous feed through said chamber, drying and waxing means.

6. A machine for finishing in a continuous fashion slide fastener stringers composed of fabric tape and a series of locking elements which are attached to an edge of such tape and are adapted to interlock with the series of locking elements of another stringer, comprising means for continuously feeding at a predetermined rate interlocked locking elements on two strips of connected stringers, means including a chamber having an entry end and a discharge end for the strips of connected stringers, means for supplying wet, hot steam at a predetermined pressure to said chamber to shrink and remove the wrinkles from the tapes passing therethrough, means for heat drying the steam wetted strips, means for applying a liquid coating of covering material to the locking elements heated by said steam chamber and drying means, means for air drying the applied covering material for a predetermined period, means for applying a high heat to the applied covering material for a predetermined period, means for applying a coating of molten wax to the locking elements on said strips heated by said steam chamber and heat drying means, means for flexing the stringers in two directions at relatively sharp angles to break up any wax between the elements thereof while maintaining the tapes thereof in unwrinkled condition, and means for drawing the tapes of the interlocked strips through said chamber, drying, coating and waxing means at a predetermined constant rate of speed greater than that of said feeding means so as to place the tapes of such stringers under a predetermined tension during their continuous feed through said chamber, drying, coating and waxing means.

7. A machine for finishing in a continuous fashion slide fastener stringers composed of fabric tape and a series of locking elements which are attached to an edge of such tape and are adapted to interlock with the series of locking elements of another stringer, comprising means for continuously feeding at a predetermined rate interlocked locking elements on two strips of connected stringers, means including a chamber having an entry end and a discharge end for the strips of connected stringers, means for supplying wet, hot steam at a predetermined pressure to said chamber to shrink and remove the wrinkles from the tapes passing therethrough, means for heat drying the steam wetted strips, means for applying a liquid coating of covering material to one side of the elements heated by said steam chamber and drying means, means for air drying the applied covering material for a predetermined period, means for applying a liquid coating of covering material to the other side of the heated locking elements, means for applying a high heat to the applied coatings for a predetermined period, means for applying a coating of molten wax to the locking elements on said strips heated by said steam chamber and heat drying means, means for flexing the stringers in two directions at relatively sharp angles to break up any wax between the elements thereof while maintaining the tapes thereof in unwrinkled condition, and means for drawing the tapes of the interlocked strips through said chamber, drying, coating and waxing means at a predetermined constant rate of speed greater than that of said feeding means so as to place the tapes of such stringers under a predetermined tension during their continuous feed through said chamber, drying, coating and waxing means.

8. A machine for finishing in a continuous fashion slide fastener stringers composed of fabric tape and a series of locking elements which are attached to an edge of such tape and are adapted to interlock with the series of locking elements of another stringer, comprising means for feeding at a predetermined rate two strips of connected stringers with the locking elements on the stringers of one strip interlocked with the locking elements on the stringers of the other strip, steaming means including an elongated chamber having an entry end and a discharge end for the strips of connected stringers, means for supplying wet, hot steam at a predetermined pressure to said chamber to shrink and remove the wrinkles from the tapes passing therethrough, means for heat drying the steam wetted strips, means for applying a liquid coating of covering material to the locking elements heated by said steam chamber and drying means and including a reservoir for the coating material, a roll rotatably mounted in said reservoir, a guide extending over the upper periphery of such roll and provided with a longitudinally extending centrally disposed aperture having a width greater than the combined width of the interlocking elements of said stringers, and a spring pressed roller for depressing the feeding elements through such aperture as they pass over said coating roll, means for flexing the stringers in two directions at relatively sharp angles to break up any covering material between the elements thereof, while maintaining the tapes thereof in unwrinkled condition, and means for drawing the tapes of the interlocked strips through said steaming, drying, coating and flexing means at a rate of speed greater than that of said feeding means so as to place the tapes of such stringers under tension during their continuous feed through said steaming, drying, coating and flexing means.

9. A machine for finishing in a continuous fashion slide fastener stringers composed of fabric tape and a series of locking elements which are attached to an edge of such tape and are adapted to interlock with the series of locking elements of another stringer, comprising means for continuously feeding at a predetermined rate two strips of connected stringers with the locking elements on the stringers of one strip interlocked with the locking elements on the stringers of the other strip, steaming means including a chamber having an entry end and a discharge end for the strips of connected stringers, means for supplying wet, hot steam at a predetermined pressure to said chamber to shrink and remove the wrinkles from the tapes passing therethrough, means for heat drying the steam wetted strips, means for applying a liquid coating of covering material to the locking elements heated by said steam chamber and drying means, means for flexing the stringers in two directions at relatively sharp angles to break up any covering material between the elements thereof, while maintaining the tapes thereof in unwrinkled condition, said flexing means including three triangularly arranged members of relatively small diameter over which the connected stringers are drawn and each having an external recess adapted to receive the interlocked locking elements of such stringers, and means rotatably supporting each of said members for free rotational movement as such connected stringers pass thereover, and means for drawing the tapes of the interlocked strips through said steaming, drying, coating and flexing means at a rate of speed greater than that of said feeding means so as to place the tapes of such stringers under tension during their continuous feed through such means.

10. A machine for finishing in a continuous fashion slide fastener stringers composed of fabric tape and a series of locking elements which are attached to an edge of such tape and are adapted to interlock with the series of locking elements of another stringer, comprising means for continuously feeding at a predetermined rate two strips of connected stringers with the locking elements on the stringers of one strip interlocked with the locking elements on the stringers of the other strip, steaming means including a chamber having an entry end and a discharge end for the strips of connected stringers, means for supplying wet, hot steam at a predetermined pressure to said chamber to shrink and remove the wrinkles from the tapes passing therethrough, means for heat drying the steam wetted strips, means for applying a liquid coating of covering material to the locking elements heated by said steam chamber and drying means, means for flexing the stringers in two directions at relatively sharp angles to break up any covering material between the elements thereof while maintaining the tapes thereof in unwrinkled condition, and means for drawing the tapes of the interlocked strips through said steaming, drying, coating and flexing means at a predetermined constant rate of speed greater than that of said feeding means so as to place the tapes of such stringers under a predetermined tension during their continuous feed through said steaming, drying, coating and flexing means, said drawing means including a pair of driven rollers, each having a centrally arranged depression on its exterior surface forming with the depression of the other roller along the line of contact of such rollers, an opening greater in cross-sectional area than the cross-sectional area of the interlocked locking members, spring means tending to maintain the exterior surfaces of such rollers in contact with one another so as to exert a drawing action on the tapes of said stringers, and means for positively driving each of said rollers.

11. A continuous method of finishing slide fastener stringers composed of fabric tape and a series of locking elements which are attached to an edge of such tape and are adapted to interlock with the stries of locking elements of another stringer, comprising taking two strips of connected stringers with the locking elements on the stringers of one strip interlocked with the locking elements on the stringers of the other strip, and feeding such interlocked strips at a predetermined rate without interruption and under a predetermined tension, and during such continuous feed of the interlocked strips, subjecting the tapes of such stringers in a substantially closed chamber to a wet, hot steam capable of shrinking the tapes of such stringers and taking out wrinkles in such tapes, then drying the stringers at an elevated temperature such as will complete the shrinking of the stringer tapes and render such tapes and the locking members thereon completely dry, then applying a coating of molten wax to the locking elements while the latter are in a heated condition and while protecting the tapes from such wax, and then flexing the interlocked stringers by bending them in two directions at relatively sharp angles to break up any wax between the elements thereof, while maintaining the tapes thereof in unwrinkled condition.

12. A continuous method of finishing slide fastener stringers composed of fabric tape and a series of locking elements which are attached to an edge of such tape and are adapted to interlock with the series of locking elements of another stringer, comprising taking two strips of connected stringers with the locking elements on the stringers of one strip interlocked with the locking elements on the stringers of the other strip, and feeding such interlocked strips at a predetermined rate without interruption and under a predetermined tension, and during such continuous feed of the interlocked strips, subjecting the tapes of such stringers in a substantially closed chamber to a wet, hot steam capable of shrinking the tapes of such stringers and taking out wrinkles in such tapes, then drying the stringers at an elevated temperature such as will complete the shrinking of the stringer tapes and render such tapes and the locking members thereon completely dry, then applying a liquid coating of covering material hardenable to form a solid protective coating to one side of the heated locking elements, air drying the applied coating for a predetermined period to harden the same, applying a liquid coating of covering material hardenable to form a solid protective coating to the other side of the locking elements and then subjecting both coatings on the locking elements to a high dry heat to harden the same, applying a coating of molten wax to the locking elements while the latter are in a heated condition and while protecting the tapes from such wax, and flexing the interlocked stringers by bending them in two directions at relatively sharp angles to break up any covering material between the elements thereof, while maintaining the tapes thereof in unwrinkled condition.

13. A machine for finishing in a continuous fashion slide fastener stringers composed of fabric tape and a series of locking elements which are attached to an edge of such tape and are adapted to interlock with the series of locking elements of another stringer, comprising means for feeding at a predetermined rate two strips of connected stringers with the locking elements on the stringers of one strip interlocked with the locking elements on the stringers of the other strip, means for shrinking and removing the wrinkles from the thus fed tapes including steaming means and a heat drying means, each being composed of an outer elongated pipe section and an inner pipe section having an exterior diameter less than the interior diameter of said outer pipe section so as to provide an inner chamber and an outer annular chamber, said inner chamber having an entry end and a discharge end for the strips of connected stringers and the ends of said annular chamber being closed, and said shrinking and wrinkle removing means including means for supplying wet hot steam at a predetermined pressure to the outer chambers of said steaming means and said heat drying means, the inner pipe section of said steaming means being perforated so that the hot steam passes therethrough into contact with the strip portions traveling through the inner chamber formed thereby, and the inner pipe section of said heat drying means being imperforate so that the strip portions traveling through the inner chamber formed thereby are subjected to a hot dry heat, means for guiding said strips substantially along the longitudinal central lines of said inner chambers, means for applying a liquid coating of covering material to the locking elements on said strips heated by said shrinking and wrinkle removing means, means for flexing the stringers in two directions at relatively sharp angles to break up any covering material between the elements thereof while maintaining the tapes thereof in unwrinkled condition, and means for drawing the tapes of the interlocked strips through said steaming, heat drying, coating and flexing means at a rate of speed greater than that at which it is fed by said feeding means so as to place the tapes of such stringers under tension during their continuous feed through said steaming, heat drying, coating and flexing means.

14. A machine for finishing in a continuous fashion slide fastener stringers composed of fabric tape and a series of locking elements which are attached to an edge of such tape and are adapted to interlock with the series of locking elements of another stringer, comprising means for feeding at a predetermined rate two strips of connected stringers with the locking elements on the stringers of one strip interlocked with the locking elements on the stringers of the other strip, means for shrinking and removing the wrinkles from the thus fed tapes including a steaming means and a heat drying means each being composed of an outer elongated pipe section and an inner pipe section having an exterior diameter less than the interior diameter of said outer pipe section so as to provide an inner chamber and an outer annular chamber, said inner chamber having an entry end and a discharge end for the strips of connected stringers and the ends of said annular chamber being closed, and said shrinking and wrinkle removing means including means for supplying wet hot steam at a predetermined pressure to the outer chambers of said steaming means and said heat drying means, the inner pipe section of said steaming means being perforated so that the hot steam passes therethrough into contact with the strip portions traveling through the inner chamber formed thereby, and the inner pipe section of said heat drying means being imperforate so that the strip portions traveling through the inner chamber formed thereby are subjected to a hot dry heat, closure means for the ends of the inner chamber of each of said steaming means and heat drying means, each closure means including a stationary cover portion and a movable cover portion, latching means for said movable cover portion, and feed openings provided in said cover portions for guiding said strips substantially along the longitudinal center line of its associated inner chamber, means for applying a liquid coating of covering material to the locking elements on said strips heated by said shrinking and wrinkle removing means, means for flexing the stringers in two directions at relatively sharp angles to break up any covering material between the elements thereof while maintaining the tapes thereof in unwrinkled condition, and means for drawing the tapes of the interlocked strips through said steaming, heat drying, coating and flexing means at a rate of speed greater than that at which it is fed by said feeding means so as to place the tapes of such stringers under tension during their continuous feed through said steaming, heat drying, coating and flexing means.

References Cited in the file of this patent

UNITED STATES PATENTS

| Number | Name | Date |
| --- | --- | --- |
| 394,268 | Haynes | Dec. 11, 1888 |
| 781,025 | Rupley | Jan. 31, 1905 |
| 1,519,085 | Barry et al. | Dec. 9, 1924 |
| 1,674,580 | Van Sluys | June 19, 1928 |
| 1,986,533 | Ronci et al. | Jan. 1, 1935 |
| 2,063,282 | Wilke | Dec. 8, 1936 |
| 2,079,563 | Reuter | May 4, 1937 |
| 2,157,212 | Moore | May 9, 1939 |
| 2,175,972 | Rainer | Oct. 10, 1939 |
| 2,251,821 | Carlile | Aug. 5, 1941 |
| 2,304,474 | Poesl | Dec. 8, 1942 |
| 2,364,467 | Nickerson | Dec. 5, 1944 |
| 2,419,922 | Tippetts | Apr. 29, 1947 |
| 2,428,307 | Calton | Sept. 30, 1947 |
| 2,539,445 | Levin | Jan. 30, 1951 |